S. E. HARRIS.
Combined Seed-Planter and Cultivator.

No. 206,444. Patented July 30, 1878.

WITNESSES:
Frances McArdle.
C. Sedgwick

INVENTOR:
S. E. Harris
BY Munn & Co
ATTORNEYS.

UNITED STATES PATENT OFFICE.

SHELDON E. HARRIS, OF WHITESBURG, TENNESSEE.

IMPROVEMENT IN COMBINED SEED-PLANTER AND CULTIVATOR.

Specification forming part of Letters Patent No. 206,444, dated July 30, 1878; application filed April 27, 1878.

*To all whom it may concern:*

Figure 1:
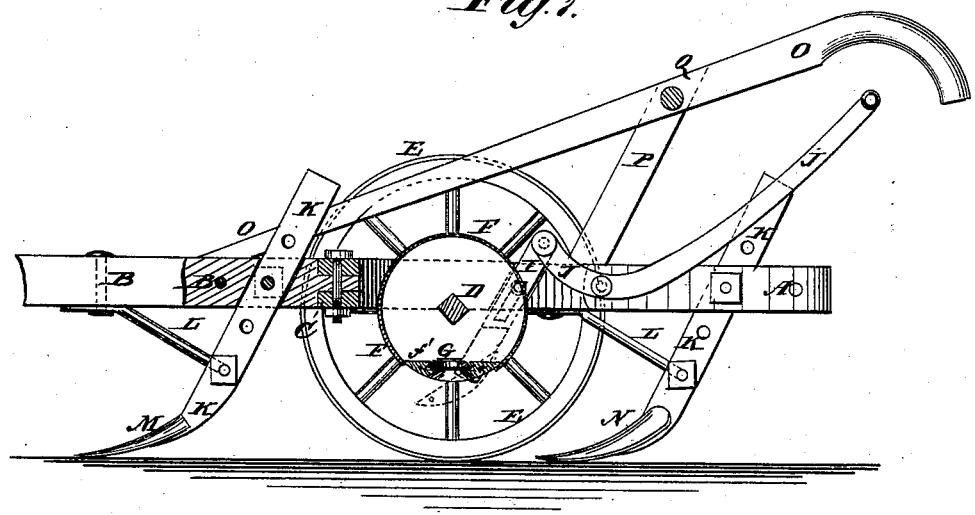
Figure 2:
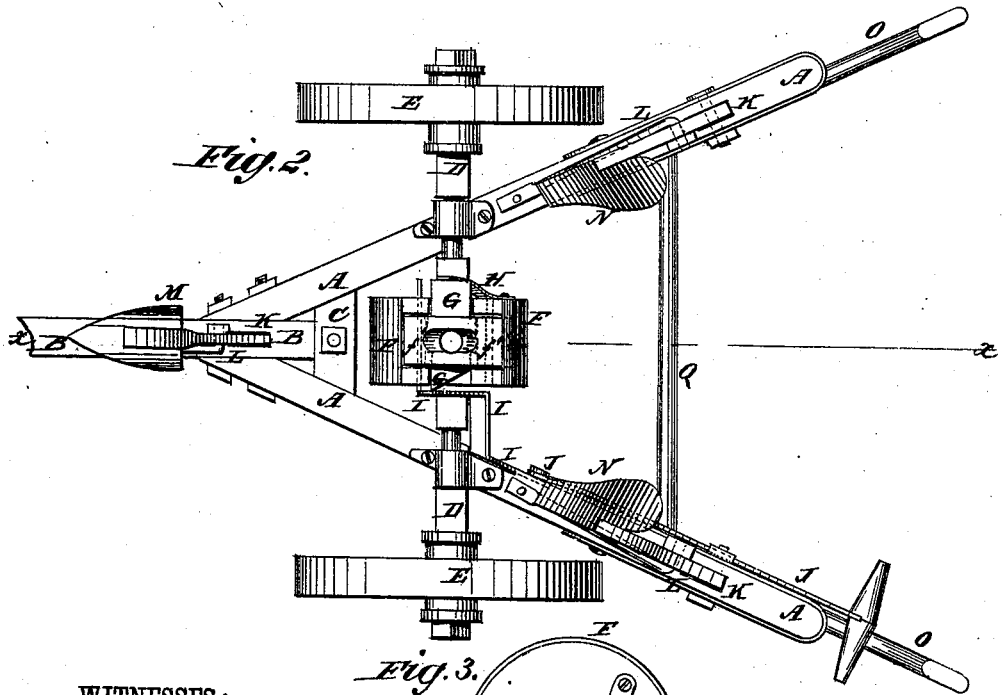
Figure 3:
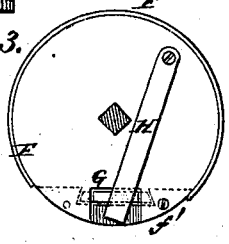

Be it known that I, SHELDON E. HARRIS, of Whitesburg, in the county of Hamblen and State of Tennessee, have invented a new and Improved Combined Seed-Planter and Cultivator, of which the following is a specification:

Figure 1 is a vertical longitudinal section of my improved machine taken through the line $x$ $x$, Fig. 2. Fig. 2 is a bottom view of the same. Fig. 3 is a detail side view of the dropping-cylinder.

Similar letters of reference indicate corresponding parts.

The object of this invention is to furnish an improved seed-planter which shall be so constructed as to open a furrow to receive the seed, drop the seed, and cover it; which may be adjusted to plant the seed at any desired depth in the ground; which may be drawn from place to place without operating the seed-dropping device, and which may be readily adjusted for use as a cultivator when required.

The invention will first be described in connection with the drawing, and then pointed out in the claim.

A are the side bars of the frame, which are placed with their forward ends inclined toward each other, as shown in Fig. 2, giving the frame a V form. The forward ends of the side bars A are bolted to the opposite sides of the rear part of the bar B, to the forward end of which the draft is applied. The connection between the bars A B A is strengthened by a short cross-bar, C, the ends of which are framed into or otherwise secured to the side bars A, and to the middle part of which is framed or otherwise secured the rear end of the bar B.

To the lower side of the side bars A are attached bearings, in which revolve the journals of the axle D, to the ends of which are attached the wheels E, so that the said wheels may carry the said axle with them in their revolution. To the middle part of the axle D is secured a hollow cylinder, F, in one side of which is formed a door, $f'$, which is secured in place by pins or bolts passing through its side parts and the end plates of the cylinder F, so that by withdrawing one of the said pins the said door may be turned upon the other pin as a hinge to allow the seed to be readily put into the said cylinder.

Through the center of the door $f'$ is formed a hole through which the seed escapes to the ground. Through holes in the end plates of the cylinder F and along the inner surface of the door $f'$ slides a plate, G, which is provided with a hole of sufficient size to contain enough seed for a hill, so that the said slide by its movements may receive the seed and drop it through the hole in the door $f'$ to the ground. The cylinder may be provided with a cut-off to prevent any more seed passing out at a time than enough to fill the dropping-hole of the slide-plate G.

The slide-plate G is pushed back after being pushed outward to drop the seed by a spring, H, the upper end of which is attached to the end plate of the cylinder F, and its lower end rests against the end of the said dropping-slide G. The other end of the dropping-slide G is beveled off, so that the said slide may be pushed forward to drop the seed by striking against the lower end of the bar I, which is bent outward and then upward, so as to pass along the inner side of one of the side bars A, to which it is secured by a bolt.

The upper part of the bar I is slotted to receive the fastening-bolt, so that it may be moved upward upon the said bolt to withdraw its lower end out of the sweep of the dropping-slide G, so that the machine may be drawn forward without operating the said dropping-slide. To the upper end of the sliding bar I is pivoted the end of a bent lever, J, which is pivoted at its bend or angle to the side bar A, and its rear end projects into such a position that it may be conveniently reached and operated by the plowman when desired.

The rear parts of the bars B and A are slotted to receive the standards K, which are secured in place by bolts passing through them and through the said bars B A. Several holes are formed through the standards K to receive the fastening-bolts, so that they may be adjusted to cause the plows to enter the ground to any desired depth. The draft-strain upon the standards K is sustained by the braces L, the forward ends of which are bolted to the bars B A. The rear ends of the braces L are bolted to the lower parts of the standards K. Several holes are formed in the standards K to receive the bolts or rear ends of the braces L, so that the said braces may be adjusted as the said standards K are adjusted. To the lower end of the forward standard K is attached a double-shovel plow, M, to open a furrow to receive the seed, and to the lower ends of the rear standards K are attached turn-plows N, with their mold-boards inward, so as to throw the soil into the furrow opened by the plow M and cover the seed.

O are the handles, the forward ends of which are secured to the forward part of the frame A B, and their rear ends are supported at the proper height by the braces P, the lower ends of which are attached to the side bars A, and their upper ends are attached to the handles O, or to the round Q that connects the said handles and holds them at the proper distance apart.

With this construction, when the machine is to be moved from place to place, by operating the lever J to raise the bar I, and by raising the plow-standards K, the machine may be drawn upon the wheels E in the same manner as a cart. To change the planter to a cultivator the seed-dropping device may be detached and the plows N replaced by double-shovel plows, thus forming a neat, convenient, and compact cultivator.

Having thus fully described my invention, I claim as new and desire to secure by Letters Patent—

The combination of the hollow cylinder F, provided with the door $f'$, the dropping-slide G, the spring H, the bent sliding bar I, and the bent lever J, with the axle D, the wheels E, the frame A B A, and the plow standards and braces K L, substantially as herein shown and described.

SHELDON EMERSON HARRIS.

Witnesses:
   C. T. HARRIS,
   P. J. DAVIS.